United States Patent
Matturi et al.

(10) Patent No.: US 12,511,048 B2
(45) Date of Patent: Dec. 30, 2025

(54) CONTROLLER FOR A MEMORY DEVICE AND A STORAGE DEVICE

(71) Applicant: Micron Technology, Inc., Boise, ID (US)

(72) Inventors: Venkata Kiran Kumar Matturi, Milpitas, CA (US); Tara Gordon, Los Gatos, CA (US); Carla L. Christensen, Garden Valley, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/199,422

(22) Filed: May 19, 2023

(65) Prior Publication Data
US 2023/0393747 A1 Dec. 7, 2023

Related U.S. Application Data

(60) Provisional application No. 63/348,206, filed on Jun. 2, 2022.

(51) Int. Cl.
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC .... G06F 3/0611; G06F 3/0659; G06F 3/0679; G06F 3/0607; G06F 3/0647; G06F 12/0253; G06F 2212/7211; G06F 12/0246
See application file for complete search history.

(56) References Cited

U.S. PATENT DOCUMENTS

| | | | |
|---|---|---|---|
| 10,175,892 B1* | 1/2019 | Kim | G06F 3/0653 |
| 10,607,708 B2 | 3/2020 | Oh et al. | |
| 10,839,887 B2 | 11/2020 | Cox et al. | |
| 11,281,601 B2 | 3/2022 | Subbarao et al. | |
| 2004/0128409 A1* | 7/2004 | Bennett | G06F 3/061 710/22 |
| 2014/0189203 A1* | 7/2014 | Suzuki | G06F 12/0866 711/103 |
| 2018/0032280 A1* | 2/2018 | Feigin | G06F 3/061 |
| 2018/0276116 A1* | 9/2018 | Hahn | G06F 3/0659 |

FOREIGN PATENT DOCUMENTS

CN 104679609 A * 6/2015 ............. G05B 19/12

* cited by examiner

*Primary Examiner* — Masud K Khan
(74) *Attorney, Agent, or Firm* — Brooks, Cameron & Huebsch, PLLC

(57) ABSTRACT

A controller can be directly coupled to a storage device and a memory device but not a host. The controller can monitor a plurality of regions of the memory device to determine whether the plurality of regions meet a criterion for fullness and responsive to determining that the plurality of regions meet the criterion, read data from the plurality of regions. The controller can, responsive to reading the data from the plurality of regions, store the data in the storage device and delete the data from the plurality of regions. The controller can further, responsive to storing the data, report to a host that the data has been moved from the memory device to the storage device. The controller can be implemented independent from the host.

20 Claims, 6 Drawing Sheets

CONTROLLER FOR A MEMORY DEVICE AND A STORAGE DEVICE

PRIORITY INFORMATION

This application claims the benefit of U.S. Provisional Application No. 63/348,206 filed on Jun. 2, 2022, the contents of which are incorporated herein by reference.

TECHNICAL FIELD

Embodiments of the disclosure relate generally to memory sub-systems, and more specifically, relate to implementing a controller for a memory device and a storage device.

BACKGROUND

A memory sub-system can include one or more memory devices or storage device that store data. The memory device can be, for example, volatile memory while the storage device can be non-volatile memory. In general, a host system can utilize a memory sub-system to store data at the memory device and the storage device and to retrieve data from the memory device and the storage device.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
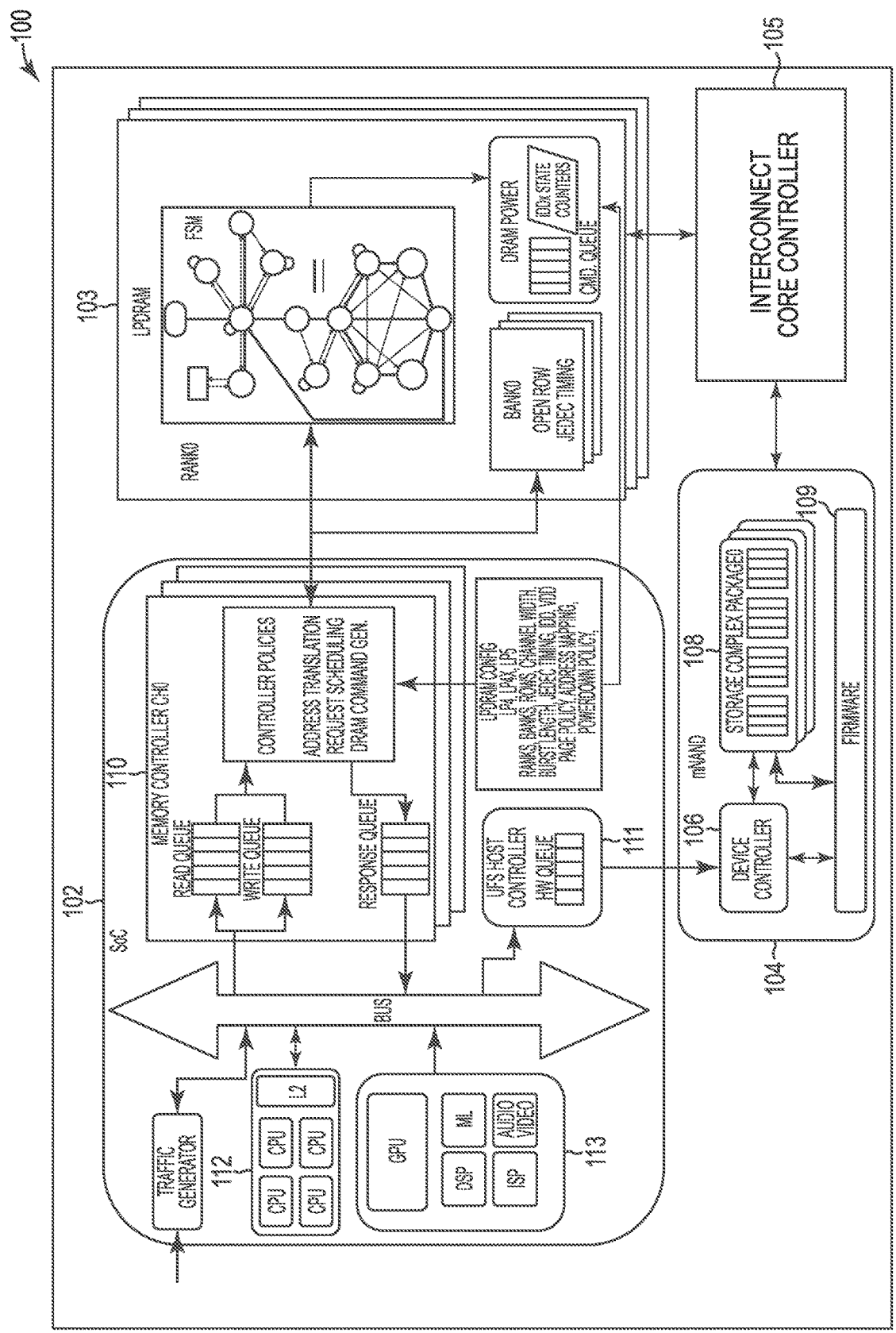
FIG. 1 illustrates an example computing system that includes a memory device, a storage device, and a controller in accordance with some embodiments of the present disclosure.

Aspects of the present disclosure are directed to implementing a controller for a memory device and a storage device, in particular a controller to transfer data between a memory device and a storage device. A memory sub-system can comprise a storage system, storage device, memory device, a memory module, or a combination of such. A storage device can describe non-volatile memory that does not require power to store data. A memory device can describe volatile memory which requires power to store the data. An example of a storage device is a storage system such as a solid-state drive (SSD). An example of a memory device is dynamic random-access memory (DRAM). Examples of storage devices and memory devices are described below in conjunction with FIG. 1, et alibi. In general, a host system can utilize a memory sub-system that includes one or more component including a memory device and a storage system that stores data. The host system can provide data to be stored at the memory sub-system and can request data to be retrieved from the memory sub-system.

In previous approaches, data can be moved between a memory device and a storage device by transferring the data to a host. In previous approaches, the memory device and the storage device are independent. Data can be routed through the host. For example, data can be routed from the memory device to the host and from the host to the storage device. Data can also be routed from the storage device to the host and from the host to the memory device. Routing data through the host can cause the host to utilize resources to route data instead of utilizing the resources to improve a user experience. For example, a response time of an application executed by the host can be negatively affected due to the routing of data between a memory device and a storage device through a host.

Aspects of the present disclosure address the above and other deficiencies by routing data through a controller implemented in the memory sub-system rather than through the host. For example, a controller can be directly coupled to a memory device and a storage device but not to a host. The controller can read data from one of the memory device and the storage device and can store the data in the other of the memory device and the storage device without routing the data through the host. Routing the data through the controller rather than through the host can reduce host workload, which can provide various benefits such as improving user experience. In previous approaches, the memory device and the storage device may not be referred to collectively as a memory sub-system because the memory device and the storage device communicate with each other through the host rather than directly with each other (e.g., through a controller of the sub-system serving as an interconnect between the storage device and the memory device). In previous approaches, the memory device and the storage device can individually be referred to as a memory sub-system. In a number of examples described herein, the memory device and the storage device can collectively be referred to as a memory sub-system because the memory device and the storage device are coupled to each other via a controller that is independent from the host.

Routing data through a controller in accordance with embodiments described herein can allow for performance improvement for universal flash storage (UFS) and/or a managed NAND (MNAND) device with direct memory access. Routing data through the controller can include moving the data and tables (e.g., memory management related information) that represent the data. The controller can move data and tables that represent the data (e.g., memory management related information). Routing data through such a controller can allow for more efficient flush of data into a storage device as compared to flushing the data through the host. Routing data through the controller can provide for enhanced security capabilities for data that can be fully isolated from a host (e.g., system on chip (SoC)), and/or outside access. Routing data through the controller can reduce the power utilized to route the data between the memory device and the storage device and can improve performance of the host.

Data routing between the memory device and the storage device through the controller can be utilized in applications that utilize large quantities of data. For example, data routing through a controller that is independent from a host can be utilized in artificial intelligence (AI) applications, applications that require security implementations, gaming applications such a virtual reality (VR) application, and/or metavers application, among others. Applications that utilize AI, applications that require security guarantees, gaming applications, VR applications, and/or metavers application can utilize data such that routing the data through a host can negatively impact performance of the host. Such applications can benefit from the routing of the data through the controller. For example, the recording of video can benefit from the routing of recorded data through the controller. Gaming applications can utilize large quantity of data for streaming visual images or can utilize large quantities of data for performing AI which can benefit from the routing of data through a controller. In various instances, data can be routed by the controller while the host is executing an application. The data that is routed by the controller can be routed to allow the data to be accessible to the application executed by the host and/or to allow for the application executed by the host to store additional data. The host and/or the application may be unaware of the routing of the data by the controller. To the host and/or the application it may appears as if there is always available memory, for example.

FIG. 1 illustrates an example computing system 100 that includes a memory device 103, a storage device 104, and a controller 105 in accordance with some embodiments of the present disclosure. The memory device 103, the storage device 104, and the controller 105 can be referred to as a memory sub-system. The memory device 103, the storage device 104, and the controller 105 can be referenced independent of one another.

A memory sub-system can comprise a storage device and a memory device. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, a hard disk drive (HDD), and a managed NAND (MNAND) device. Examples of a memory device include a dual in-line memory module (DIMM), a small outline DIMM (SO-DIMM), and DRAM (e.g., low-power DRAM (LPDRAM)).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to the storage device 104 and the memory device 103. The host 102 can also be referred to as a system on chip (SoC) 102. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 102 can include a processor chipset 112 and a software stack executed by the processor chipset. The processor chipset 112 can include one or more cores, one or more caches. The processor chipset 112 can include one or more processing devices. The processing devices represent one or more general-purpose processing devices such as a microprocessor, a central processing unit (CPU), or the like. More particularly, the processing devices can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing devices can also be one or more special-purpose processing devices such as an application specific integrated circuit (ASIC), a field programmable gate array (FPGA), a digital signal processor (DSP), network processor, or the like. The processing devices can be configured to execute instructions for performing the operations and steps discussed herein. The host system 102 can further include a network interface device (not shown) to communicate over a network (not shown).

The host system 102 can also include multiple controllers including controller 110 and controller 111. Controller 110 can be a memory controller configured to provide signals to volatile memory (e.g., memory device 103) while controller 111 can be a UFS host controller configured to provide signals to a non-volatile memory (e.g., storage device 104). The host system 102 can also include a graphical processing unit (GPU) 113 and associated circuitry. The host system 102 can read and write data to the memory device 103 and the storage device 104 utilizing the controller 110 and the controller 111, respectively.

The host system 102 can be coupled to the memory device 103 and the storage device 104 via different physical host interfaces. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The host system 102 can be coupled to the memory device 103 via a first interface and to the storage device 104 via a second interface. The first interface and the second interface can be separate and independent from one another. The interfaces (e.g., the first interface and the second interface) can be used to transmit data between the host system 102 and the memory device 103 and the storage device 104. The physical host interface can provide an interface for passing control, address, data, and other signals between the storage device 104, the memory device 103, and the host system 102.

The memory devices 103 can include any combination of the different types of volatile memory devices. The volatile memory devices (e.g., memory device 103) can be, but are not limited to, random access memory (RAM), such as dynamic random-access memory (DRAM), LPDRAM, and synchronous dynamic random access memory (SDRAM).

Some examples of non-volatile storage devices (e.g., storage device 104) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND). NAND type flash memory can also include mNAND.

Each of the memory device 103 and the storage device 104 can include one or more arrays of memory cells. For example, the storage device 104 includes arrays 108. One type of memory cell, for example, includes single level cells (SLC) which can store one bit per cell. Other types of memory cells, such as multi-level cells (MLCs), triple level cells (TLCs), quad-level cells (QLCs), and penta-level cells (PLC), can store multiple bits per cell. In some embodiments, each of the memory devices 103 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. Arrays of memory cells can also include DRAM and/or SRAM memory cells, among other types of volatile arrays of memory cells. The memory cells of the memory devices 103 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the storage device 104 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

In this example, the host 102 includes host controllers 110 and 111. The controllers 110, 111 can communicate with the memory device 103 and the storage device 104, respectively, to perform operations such as reading data, writing data, or erasing data at the memory device 103 and/or the storage device 104 and other such operations. The controllers 110, 111 can include hardware such as one or more integrated circuits and/or discrete components, a buffer memory, or a combination thereof. The hardware can include digital circuitry with dedicated (i.e., hard-coded) logic to perform the operations described herein. The controllers 110, 111 can communicate with controllers internal to the memory device and the storage device (e.g., device controller 106) to perform the operations described. The controllers (e.g., device controller 106) internal to the memory device 103 and the storage device 104 can be a microcontroller, special purpose logic circuitry (e.g., a field programmable gate array (FPGA), an application specific integrated circuit (ASIC), etc.), or other suitable processor.

The controllers internal to the memory device 103 and the storage device 104 can include a processor (e.g., a processing device) configured to execute instructions stored in a local memory of the memory device 103 or the storage device 104. The local memory of the memory device 103 or the storage device 104 can include an embedded memory configured to store instructions for performing various processes, operations, logic flows, and routines that control operation of the memory device 103 and/or the storage device 104, including handling communications between the memory device 103 and/or the storage device 104 and the host system 102.

In some embodiments, the local memory of the storage device 104 and/or the memory device 103 can include memory registers storing memory pointers, fetched data, etc. The local memory can also include read-only memory (ROM) for storing micro-code. While the example memory storage device 104 is shown as including a controller 106 in FIG. 1, in another embodiment of the present disclosure, the storage device 104 does not include the controller 106, and can instead rely upon external control (e.g., provided by an external host, or by a processor or controller separate from the memory sub-system).

In general, the controller 106 and/or a controller of the memory device 103 (not shown) can receive commands or operations from the host system 102 and can convert the commands or operations into instructions or appropriate commands to achieve the desired access to the storage device 104 and/or the memory device 103. The controller 106 and/or the controller of the memory device 103 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the storage device 104 and/or the memory device 103, respectively. The controller 106 and/or a controller of the memory device 103 can further include host interface circuitry to communicate with the host system 102 via the physical host interface. The host interface circuitry of the memory device 103 or the storage device 104 can convert the commands received from the host system 102 into command instructions to access the memory device 103 or the storage device 104 as well as convert responses associated with the memory device 103 or the memory device 104 into information for the host system 102.

The memory device 103 and/or the storage device 104 can also include additional circuitry or components that are not illustrated. In some embodiments, the memory device 103 and/or the storage device 104 can include a cache or buffer (e.g., DRAM) and address circuitry (e.g., a row decoder and a column decoder) that can receive an address from the controller 106 and/or a controller of the memory device 103 and decode the address to access the memory device 103 and/or the storage device 104.

In some embodiments, the storage device 104 includes the controller 106 that operates in conjunction with controller 111 to execute operations on one or more memory cells of the storage devices 104. An external controller (e.g., controller 111) can externally manage the storage device 104 (e.g., perform media management operations on the storage device 104). In some embodiments, a storage device 104 is a managed storage device, which is a raw storage device combined with a local controller (e.g., controller 106) for media management within the same memory device package. An example of a managed storage device is a managed NAND (MNAND) device. The storage device 104 can also include firmware 109 to perform operations for the storage device 104. The storage device 104 can also include the storage complex packages 108 which can include arrays of memory cells configured to store data. The memory device 103 can also include arrays of memory cells arraigned in banks.

The system 100 can also include an interconnect core controller 105 (IICC) referred to as controller 105. The controller 105 can be coupled to the memory device 103 and the storage device 104. The controller 105 can be referred to as being "directly coupled" to the memory device 103 and the storage device 104 because the controller 105 is coupled to the memory device 103 and the storage device 104 without being directly coupled to the host 102. The controller 105 can receive signals from the host 102 through the storage device 104. For instance, the host 102 can provide signals to the storage device 104 via an interface coupling the storage device 104 to the host 102. The controller 105 can access the signals received by the storage device 104 and can identify signals intended for the controller 105.

The storage device 104 can also route the signals received from the host 102 to the controller 105. For example, the storage device 104 can receive signals from the host 102 at the controller 106. The controller 106 can identify signals intended for the controller 105 and can route signals intended for the controller 105 to the controller 105. In various instances, the controller 105 can also provide signals to the storage device 104 which can be routed to the host 102. For instances, the signals received at the storage device 104 from the controller 105 can be routed to the host 102 via an interface coupling the host 102 to the storage device 104 without further processing of the signals by the storage device 104. The signals received at the storage device 104 can be received at the controller 106. The controller 106 can receive signals from the controller 105 and can process the signals by determining whether the signals are intended for the storage device 104 or the host 102. If the signals are intended for the host 102, the controller 106 can route the signals to the host 102. The controller 105 can utilize the interface coupling the storage device 104 to the host 102 without being directly coupled to the host 102. The interface coupling the storage device 104 to the host 102 can include a plurality of buses including a command bus, a data bus, and/or an address bus, among other possible buses that couple the host 102 to the storage device 104.

The controller 105 can be configured to transfer data from the memory device 103 to the storage device 104 and from the storage device 104 to the memory device 103 without routing the data through the host 102. Routing the data between the memory device 103 and the storage device 104 via the controller 105 can allow the host 102 to utilize the CPUs 112 for operations other than routing data from between the memory device 104 and the storage device 103 which can improve user experience. As used herein, routing data can refer to moving data between the memory device 103 and the storage device 104. Routing data can include reading the data from one of the memory device 103 or the storage device 104 and storing the data in the other one of the memory device 103 or the storage device 104.

The controller 105 can comprise circuitry configured to route data. For example, the controller 105 can be a microcontroller, special purpose logic circuitry (e.g., a field programmable gate array (FPGA), an application specific integrated circuit (ASIC), etc.), or other suitable processor. In various instances, the controller 105 can be implemented in a separate die than a die utilized to implement the storage device 104 (e.g., storage die) or a die utilized to implement the memory device 103 (e.g., memory die).

Figure 2:
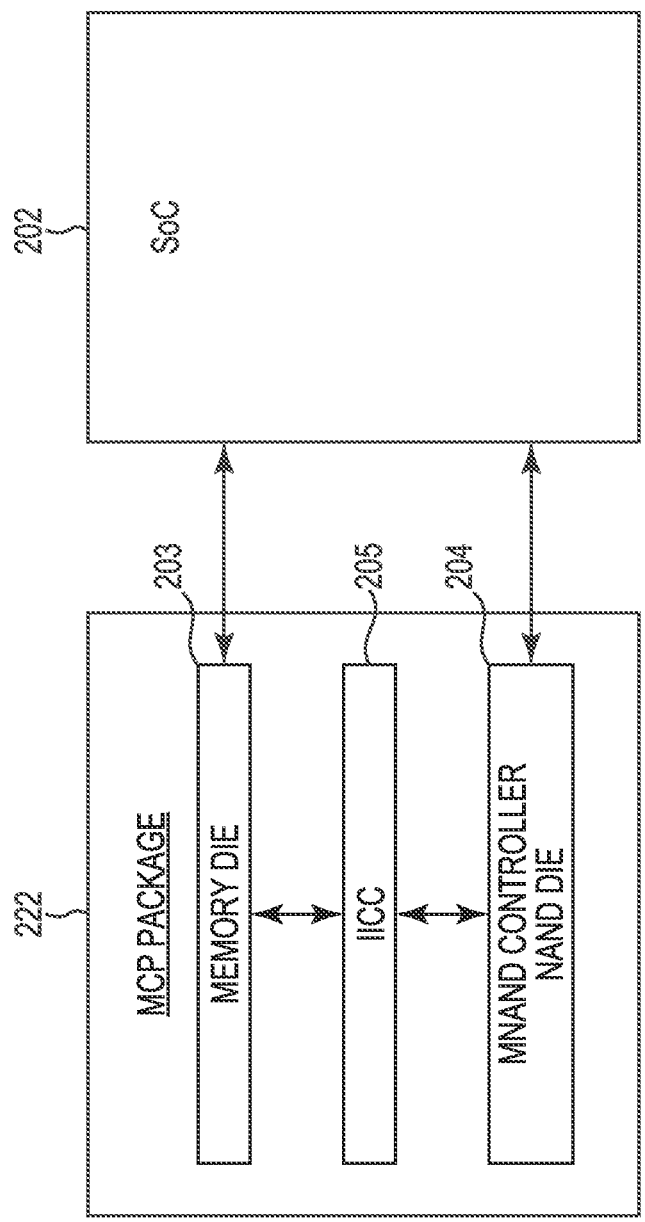
FIG. 2 is a block diagram corresponding to a multichip package in accordance with some embodiments of the present disclosure.

FIG. 2 is a block diagram corresponding to a multichip package (MCP) 222 in accordance with some embodiments of the present disclosure. The MCP 222 can include a memory die 203 and a storage die 204 (e.g., NAND die comprising a MNAND controller). The MCP 222 also includes an interconnect core controller (e.g., IICC) 205 also referred to herein as the controller 205. The MCP 222 can be coupled to the host 202 (e.g., SoC).

An MCP 222 is a package that comprises multiple die (e.g., chips) or packaged devices (e.g., memory device 203 and storage device 204). As used herein the terms die, chip, and device are used interchangeably. For example, the memory die 203 can be referred to as a memory chip 203 or a memory device 203 and the storage die 204 can be referred to as a storage chip 204 or a storage device 204. The memory device 203 and the storage device 204 can be incorporated into a single package which also comprises the controller 205. The MCP 222 can be an alternative to an ASIC where the memory device 203 and the storage device 204 are not implemented in a same package.

The host 202 can be coupled to the memory device 203 via a first physical interface and to the storage device 204 via a second physical interface that is different from the first physical interface. However, the host 202 is not directly coupled to the controller 205 via a separate interface. In various examples, the host 202 can provide signals to the controller 205 via the storage device 204. For example, the host 202 can provide signals to the storage device 204 that are intended for the controller 205. The storage device 204 can provide the signals to the controller 205.

In various examples, the controller 205 can receive signals from the host 202 via the storage device 204 that describe a portion of the storage device 204 and/or a portion of the memory device 203 from which the controller 205 can read and/or write to. The host 202 can provide a first address range of the storage device 204 and a second address range of the memory device 203 through the storage device 203. The host 202 can provide the first address range and the second address range to the controller 205. The controller 205 can read data from the memory cells of the storage device 204 having addresses included in the first address range. The controller 205 can write the data to memory cells of the memory device 203 having addresses included in the second address range. The controller 205 can also read data from memory cells of the memory device 203 having addresses included in the second address range. The controller 205 can store the data to the memory cells of the storage device 204 having addresses included in the first address range.

Figure 3:
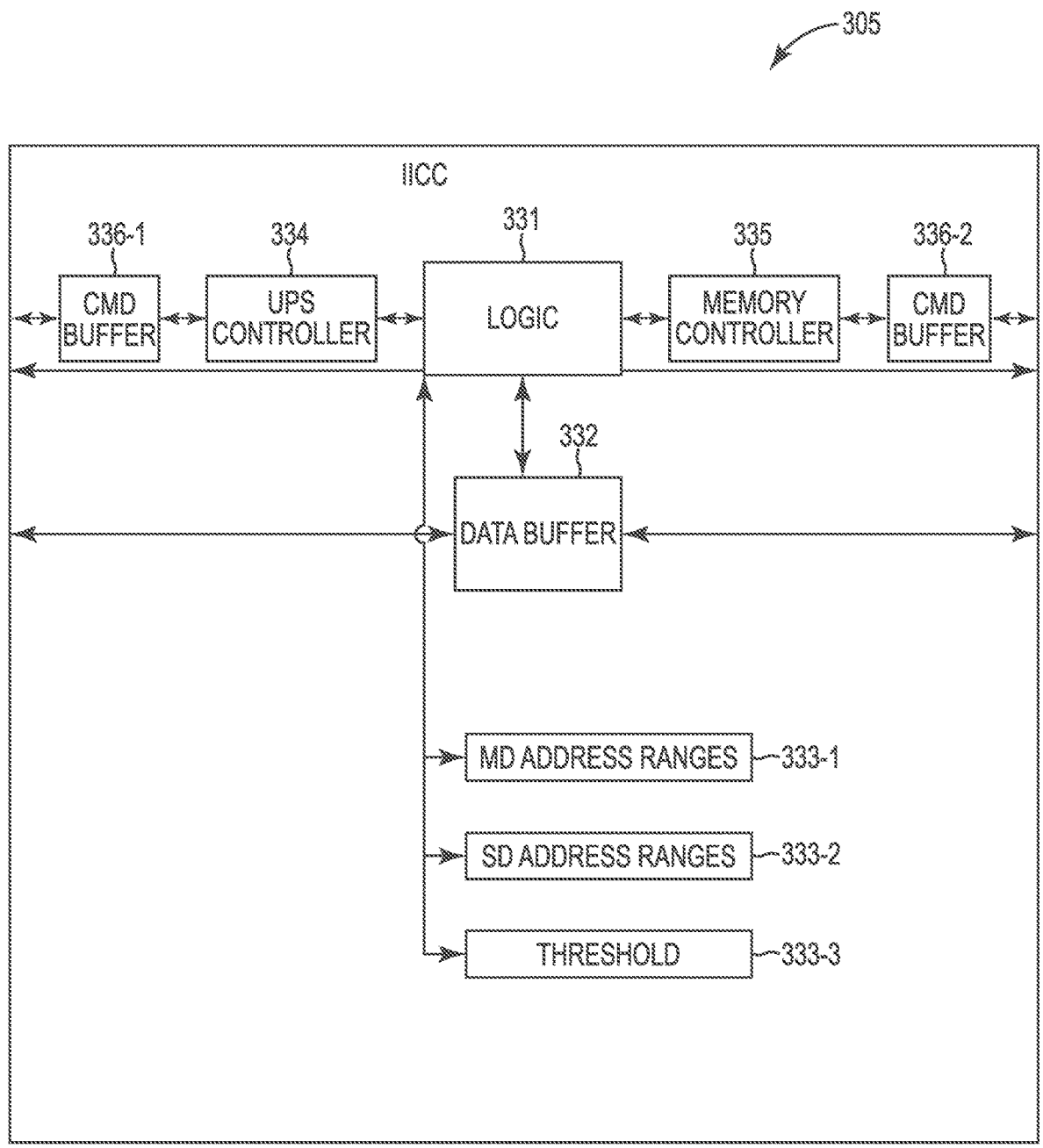
FIG. 3 is a block diagram corresponding to a controller in accordance with some embodiments of the present disclosure.

FIG. 3 is a block diagram corresponding to a controller 305 in accordance with some embodiments of the present disclosure. The controller 305 is analogous to controllers 105 and 205 of FIGS. 1 and 2, respectively. The controller 305 can be coupled to a storage device and a memory device (not shown). The controller 305 can include logic 331 to determine what data to read and/or where to store the data read. The controller 305 can also include a buffer 332 configured to store data read from the memory device or the storage device. The controller 305 can also include a controller 334 and a controller 335. The controller 305 can further include buffers 336-1 and 336-2. The controller 305 can further include registers 333-1, 333-2, and 333-3, among other registers, buffers, controllers, and/or logic.

The controllers 334, 335 can include hardware such as one or more integrated circuits and/or discrete components, a buffer memory, or a combination thereof. The hardware can include digital circuitry with dedicated (i.e., hard-coded) logic to perform the operations described herein.

The logic 331 can be configured to determine when to move data from the storage device to the memory device or from the memory device to the storage device. The logic 331 can make said determination utilizing a first address range stored in the register 333-1, a second address range stored in the register 333-2, and/or a threshold stored in the register 333-3. The first address range can correspond to an address range of the storage device and the second address range can correspond to an address range of the memory device. The threshold can be utilized to determine, for example, how full the first address range or the second address range is. In various examples, there can be multiple address ranges per device (e.g., memory device and/or storage device) and/or multiple thresholds. For example, each address range can have a corresponding threshold.

The address ranges (e.g., first address range and second address range) and the threshold can be provided by a host through the storage device. For instance, the address ranges and the threshold can be provided as boot time of the host, the storage device, the memory device, and/or the controller 305. The host can provide a command to store the address ranges and/or the threshold via a command bus, address bus, and/or data bus coupling the host to the storage device. The storage device can route the command to the controller 305. The controller 305 can receive the command routed from the storage device at the buffer 336-1. The controller 305 decode the command stored at the buffer 336-1 utilizing the controller 334. The controller 334 can provide the decoded command to the logic 331. The logic 331, responsive to receipt of the decoded command, can store the address ranges in the registers 333-1, 333-2 and/or can store the threshold in the register 333-3.

Responsive to storing the address ranges in the registers 333-1, 333-2 and/or the threshold in the register 333-3, the controller 305 can begin to monitor the storage device and the memory device. For example, the controller 305 can provide commands to the storage device and the memory device via the controllers 334, 335 and the buffers 336-1, 336-2. Responsive to providing the commands to the storage device and the memory device, the controller 305 can receive signals indicating how full the address ranges are. An address range can be full if memory cells having addresses included in the address range cannot store additional data without losing data already stored in the memory cells. A measure of how full the address range is can be provided as a percentage and/or as a quantity of data. For example, the memory device can provide a response that describes a percentage of the memory cells of the address range that store data (e.g., are being utilized) or a percentage of the memory cells of the address range that are available to store data (e.g., that are not being utilized). The memory device can also provide a response that describes a quantity of data stored in the memory cells of the address range.

The controller 305 can compare the percentage and/or the quantity of data to the threshold stored in the register 333-3. The controller 305 can compare the percentage and/or the quantity of data to the threshold to determine whether to move data. For instance, the controller 305 can provide signals through the memory controller 335 to inquire a percentage of memory cells in the address range that are being utilized to store data and/or a quantity of data that is stored in the memory cells in the address range. The logic 331 can receive the percentage and/or quantity of data and can compare the percentage and/or quantity of data to the threshold. If the percentage and/or quantity of data is greater than the threshold, then the logic 331 can cause the data stored in the memory cells in the address range of the memory device to be moved to the storage device. In various instances, data can be moved if the percentage and/or quantity of data is less than the threshold. For example, if the percentage represents memory cells that are available to store data, then a percentage that is less than the threshold can indicate that more memory cells are needed to store data.

The logic 331 can, responsive to determining to move data, provide a read command to the memory device through the controller 335 or the storage device through the controller 334. The logic 331 can receive the data read and store the data in the buffer 332. The logic 331 can then provide a write command to the other device and provide the data stored in the buffer 332 to the other device. For instance, if data is read from the memory device, then the data can be stored to the storage device. If the data is read from the storage device, then the data can be stored in the memory device.

In various instances, the logic 331 can utilize the first address range and the second address range to determine where to read data from and where to store the data. The logic 331 can cause data to be read from the first address range, stored in the registers 331-1, of the storage device and data to be written to the second address range, stored in the registers 331-2, of the memory device. The logic 331, responsive to reading data from a first address range of the storage device or the second address range of the memory device, can cause the data to be deleted from the first address range or the second range from which the data was read to make the address range available to store additional data. This can be the case, for example, in applications that store data such as a recoding application (e.g., video recording application) or applications that generate data. In applications where the emphasis is the use of the data, the data may not be deleted. For instance, if the data is read from the storage device, then the data may not be deleted from the storage device given that the data may need to be utilized repetitively or the permanent storage location of the data is in the storage device and is temporarily stored in the memory device.

Figure 4:
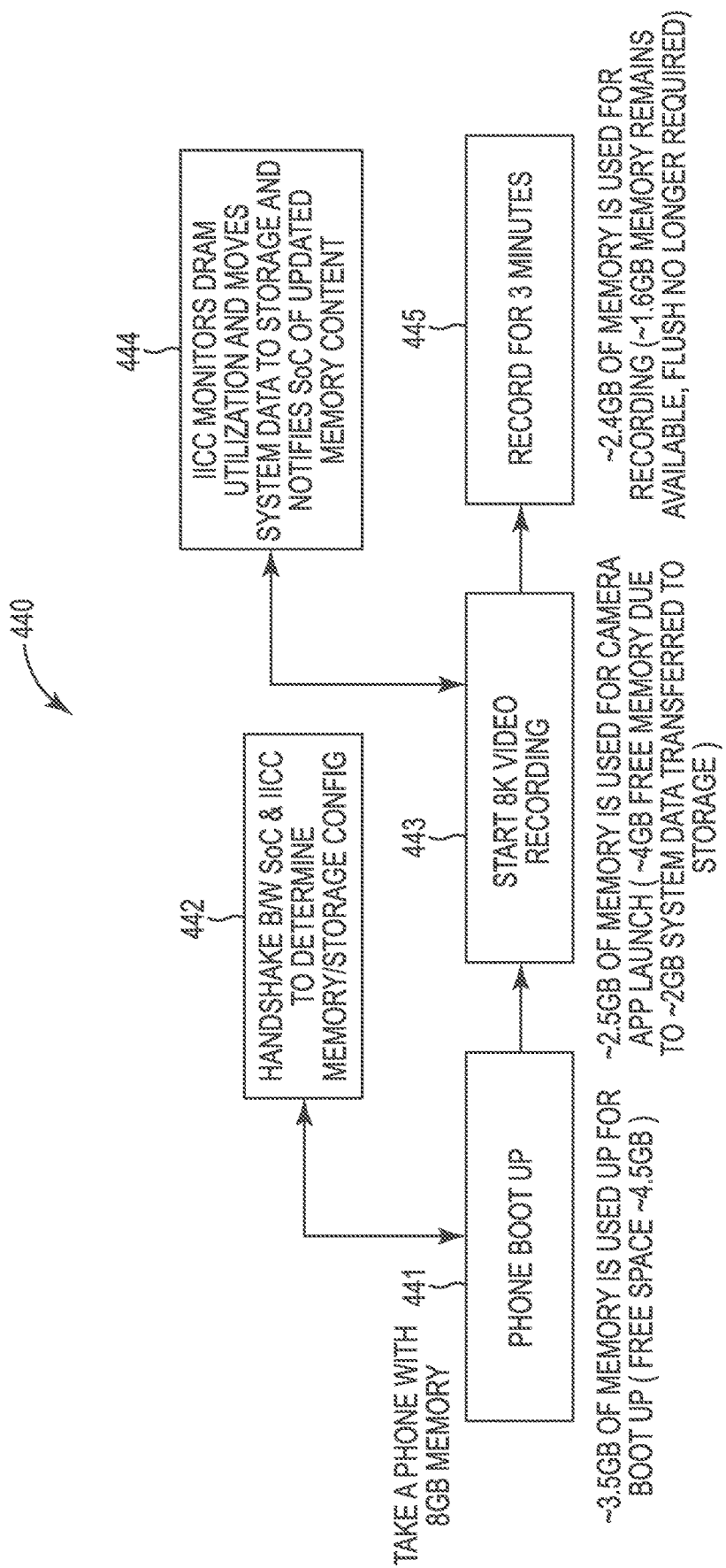
FIG. 4 is a flow diagram corresponding to a controller in accordance with some embodiments of the present disclosure.

FIG. 4 is a flow diagram 440 corresponding to a controller (e.g., IICC) in accordance with some embodiments of the present disclosure. The flow diagram 440 shows the operations performed by a host and the operations performed by the controller (e.g., IICC).

At operation 441, the host can perform a boot sequence to boot up a phone, for example. The phone may comprise 8 GB of volatile memory (e.g., memory device) that is available to store data. The boot sequence may utilize 3.5 GB of the volatile memory which may leave 4.5 GB of memory available to store application data.

At operation 442, the host may initiate a handshake operation with the controller (e.g., IICC). The handshake operation can describe the commands, data, and/or addresses that are provided from the host to the controller (e.g., IICC) to cause the controller to monitor a memory device and/or a storage device and move data when a portion of the memory device and/or the storage device is full. The handshake operation can be utilized to provide a first address range of a storage device and a second address range of a memory device. The handshake operation can also be utilized to provide a threshold or a different metric by which the controller can determine when to move data. The handshake operation can also be utilized to provide the controller with variables needed to monitor and move data.

At 443, the host can begin recording. For example, the host can begin recording 8K video. A launch of a camera application that records in 8K can utilize 2.5 GB of volatile memory. In various instances, without the use of the controller the 2.5 GB of data utilized to launch the camera application would be subtracted from the 4.5 GB of volatile memory that is available after the boot sequence resulting in 2 GB of volatile memory being available to record data (e.g., 8 k video). If the controller is utilized, at operation 444, the controller can monitor the volatile memory to determine whether more volatile memory is needed to record data. The controller can determine that more space (e.g., volatile memory) is needed to record data and the controller can move data to the non-volatile memory (e.g., storage device). For example, the controller can move 2 GB of system data from the memory device to the storage device leaving 4 GB available of the volatile memory for recording data. The 2 GB of system data can be moved after operation 441 is performed, during the performance of operation 443, and/or after operation 443 is performed. In various instances, the controller can notify the host (e.g., SoC) of the changes to the memory device and/or the storage device. For example, the controller can notify the SoC that 4 GB of space is available in the memory device and can provide the address range of the available space in the memory device to the host. The controller can also provide notice to the host that the data vacated from the memory device has been moved to the storage device and an address range of the storage device that stores the vacated data.

At operation 445, the host can record data by storing the data in the memory device. For example, the host can record 2.4 GB of data in the volatile memory in the first 3 minutes of recording 8 k video. The volatile memory can have 1.6 GB of data available if the controller moved the system data to the storage device. If the controller was not utilized, then the host would not be able to record the 2.4 GB of data in the volatile memory but instead would have been able to record 2 GB of data and would have had to move the recorded data from the memory device to the storage device which would have caused a delay in the use of the host to record data.

If the controller was utilized, then the movement of the recorded data would be delayed as compared to examples where the controller is not utilized. The movement of the recorded data to non-volatile memory would have been performed by the controller which would have allowed the host to be utilized for recording without interruption. The movement of the recorded data to the non-volatile memory, as performed by the controller, would have improved user experience. FIG. 4 provides an example of the benefits of using the controller (e.g., IICC) to move data instead of allowing the host to move the data.

Figure 5:
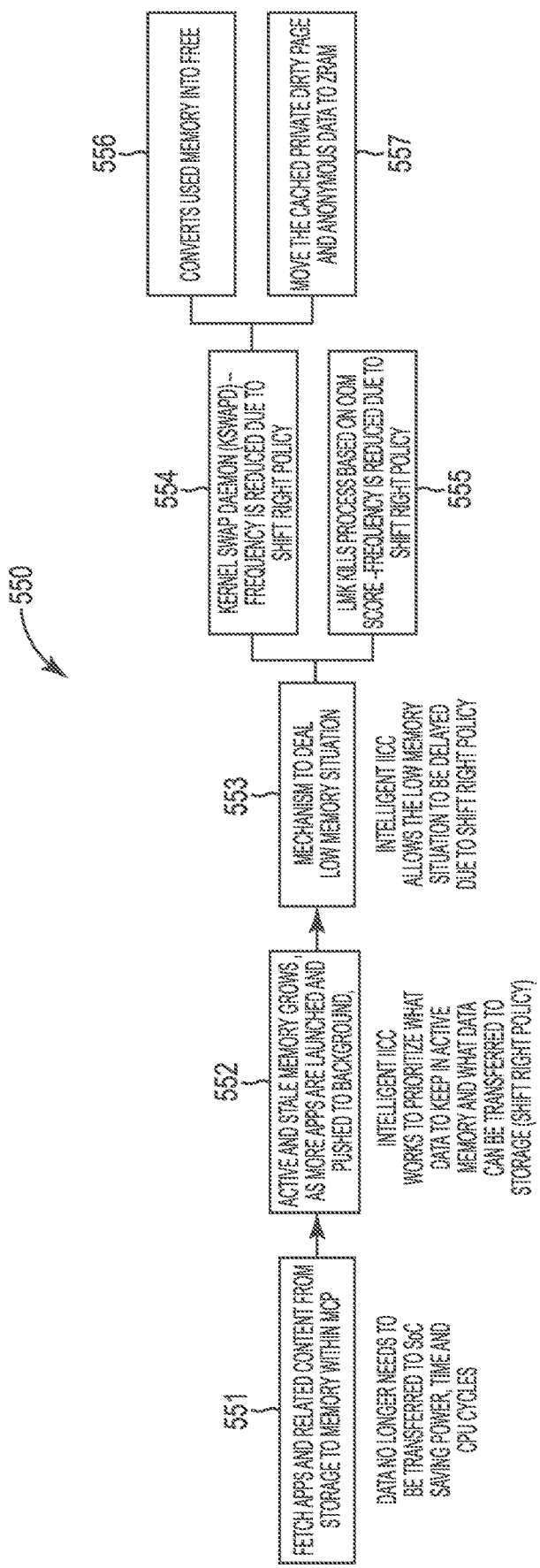
FIG. 5 is a flow diagram corresponding to a controller in accordance with some embodiments of the present disclosure.

FIG. 5 is a flow diagram 550 corresponding to a controller in accordance with some embodiments of the present disclosure. At operation 551 of flow diagram 550, the controller (e.g., IICC) coupled to the memory device and the storage device can fetch applications and related content from the storage device and can store the applications and related content to the memory device. The controller can be incorporated in the MCP along with the memory device and the storage device. In examples where the controller is not utilized, the host would have to fetch the applications and related content from the storage device and would have to store the applications and the related content to the memory device. Fetching the applications and the related content can include reading data utilized to execute an application. For instance, the controller can fetch AI applications, gaming applications, and/or VR applications, among other applications that can be retrieved by the controller. The related content can refer to data that is utilized by the applications such as video data utilized by a VR application, profile data utilized by a gaming application, and/or network setting utilized by the AI application. Fetching the applications and related content via the controller can save power, time, and CPU cycles as compared to fetching the applications and related content via the host (e.g., SoC).

At operation 552, more applications can be launched which can cause the data stored in the memory device to be stale. Stale data referrers to data that is not active and that is pushed to the background. Data can be pushed to the background if the data is not utilized, for example. In various instances, the host can launch the additional applications or the controller can launch the additional applications. The controller can monitor the data stored in the memory device to determine what data to keep active in the memory and what data to transfer to the storage device. The decision of what data to transfer to the storage device can be performed utilizing a shift right policy. The shift right policy can be utilized by the controller to determine when to transfer data. For instance, the data can be transferred if memory cells having an address range are full. The data can be transferred if the data is not being actively utilized, among other examples of when data can be transferred.

At operation 553, the mechanism employed by the host to deal with low memory situations can be delays due to a use of the controller. The implementation of the shift right policy can cause data to be transferred which can make memory available. Making memory available can lead to the avoidance of low memory situations which can delay the host's mechanism for transferring data. In various examples, the controller and the host can work in concert to transfer data to make memory available. For example, the controller can transfer data from the memory device to the storage device in concert with the host's transfer of different data from the memory device to the storage device. The use of the controller may not, in its entirety, cause the host to cease the transfer to data all together.

At operations 554, a kernel swap daemon can cause the transfer of data by a host. For example, the host can, at operation 556, covert used memory into free memory and can, at operation 557, move the cached private dirty page and anonymous data to the storage device (e.g., zRAM). Operations 556, 557 show examples of the transfer of data from the memory device to the storage device that can be performed by the host. At operation 555, a low memory kill (LMK) daemon can be utilized by the host based on an out of memory (OOM) score to transfer data from the memory device to the storage device. As used herein, the LMK daemon can be utilized to kill the least essential process to keep the system performing at acceptable levels. The LMK daemon can be utilized by the host to kill the least essential processes. Processes can be killed by moving the data that comprises the process from the memory device to the storage device. The LMK daemon can utilize a score (e.g., OOM score) that defines memory available to the system. Both the operations 554, 555 can be delayed due to a use of the shift right policy which can cause the controller to transfer data from the memory device to the storage device.

Figure 6:
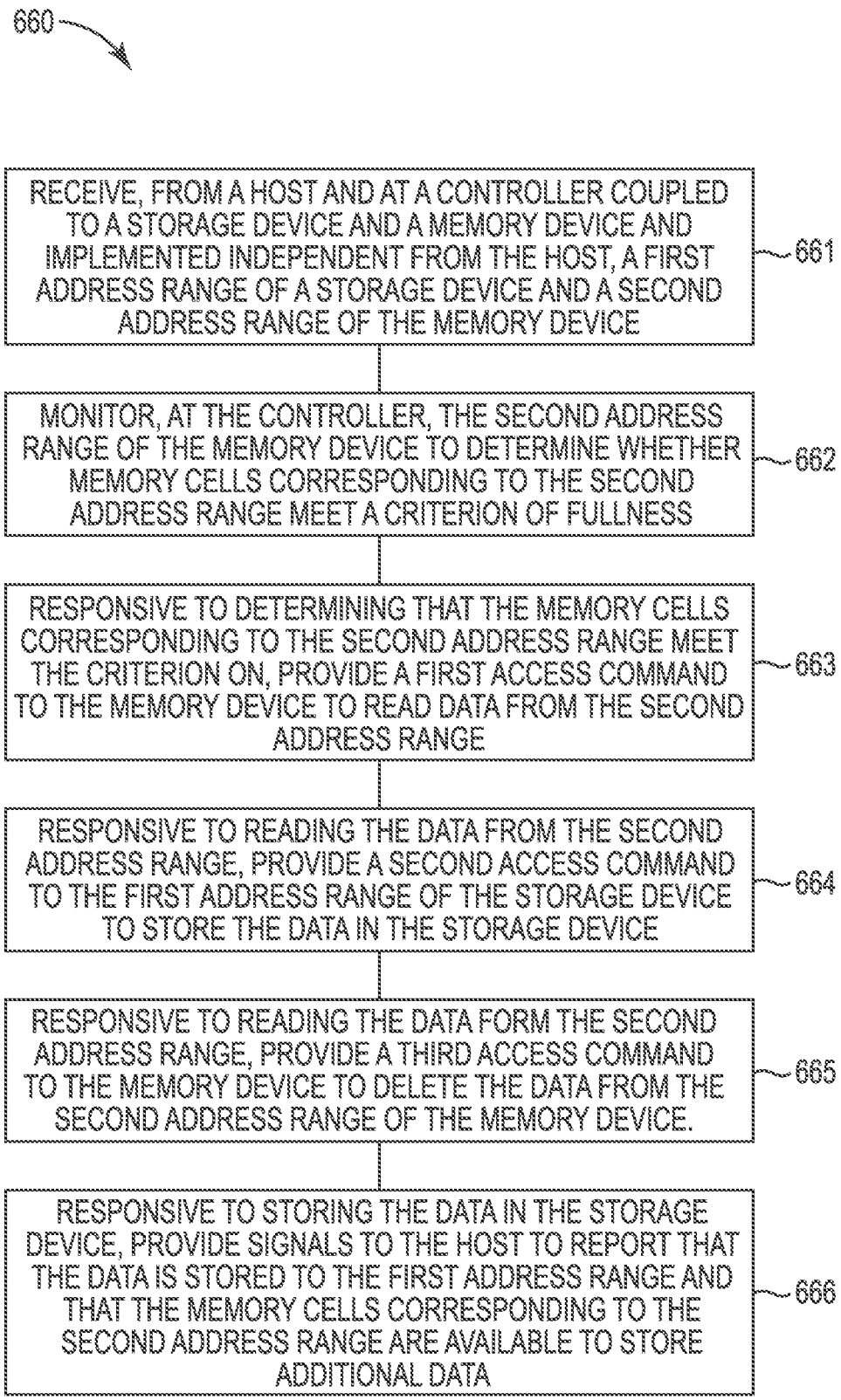
FIG. 6 is a flow diagram corresponding to a method for transferring data between a memory device and a storage device utilizing a controller in accordance with some embodiments of the present disclosure.

FIG. 6 is a flow diagram corresponding to a method 660 for transferring data between a memory device and a storage device utilizing a controller in accordance with some embodiments of the present disclosure. The method 660 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 660 is performed by the controller 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 661, a first address range of a storage device and a second address range of a memory device can be received from a host and at a controller coupled to the storage device and the memory device. The controller can be implemented independent from the host. The controller can be implemented independent from the host because the host and the controller are not directly coupled. The controller can receive signals form the host through the storage device via an interface coupling the host to the storage device. The controller is not part of the host and is not coupled to the host via a separate interface than the interface coupling the host to the storage device or the interface coupling the host to the memory device.

At operation 662, the second address range of the memory device can be monitored, at the controller, to determine whether memory cells corresponding to the second address range meet a criterion of fullness. The controller can monitor the memory device by providing commands to the memory device. The commands provided from the controller to the memory device can be provided without the use of the host and/or a knowledge of the commands by the host. For instance, the commands can be provided directly to the memory device from the controller without signals representing the command being provided to the host or being transferred via an interface that couples the host to the memory device. A criterion of fullness can describe a standard by which a determination can be made as to how full the memory cells are. A criterion of fullness can be a percentage of the memory cells utilized to store data or a percentage of the memory cells that are available to store data. A criterion of fullness can also be expressed as a quantity of data stored in the memory cells. The criterion of fullness can be a threshold, for example.

At operation 663, responsive to determining that the memory cells corresponding to the second address range meet the criterion of fullness, a first access command can be provided to the memory device to read data from the second address range. The data can be read by the controller so that the controller has the data to provide to the storage device.

At operation 664, responsive to reading the data from the second address range, a second access command can be provided to the storage device to store the data in memory cells having the first address range of the storage device. The controller can provide the second access command to the storage device. The controller can also provide the data to the storage device. At operation 665, responsive to reading the data from the second address range, a third access command can be provided to the memory device to delete the data from the second address range of the memory device. Deleting the data from the second address range can include deleting the data from the memory cells having the second address range such that the memory cells are free and available to store additional data.

At operation 666, responsive to storing the data in the storage device, signals can be provided to the host to report that the data is stored to the first address range and that the memory cells corresponding to the second address range are available to store additional data. The controller can report to the host the movement of the data from the memory device to the storage device.

The controller can monitor the second address range by determining that a quantity of data stored at the second address range is greater than a threshold. Data can be stored at the second address range by storing the data in memory cells having the second address range. A quantity of data can refer to a measure of the data stored in the memory cells having the second address range. For example, a quantity of data can be 1 GB.

Responsive to determining that the quantity of data is greater than the threshold, the controller can determine that the memory cells corresponding to the second address range are full. The second address range can be full if the quantity of data is greater than the threshold. The threshold can be received from the host. The threshold can be received at the controller through an interface coupling the host to the storage device and/or the storage device.

In various instances, the address ranges including the first address range and the second address range can be logical address ranges instead of a physical address range. The controller can monitor the logical address range of the memory device. The controller can convert the logical addresses to physical addresses and then utilize the physical addresses to monitor the second address range of the memory device.

In various instances, the controller can notify the host of the movement of data. The controller can notify the host by modifying a table of the host to reflect that the data is stored in the first address range and/or that the memory cells corresponding to the second address range are available to store additional data. The controller can provide signals to the host via the storage device to provide notice to the host of the movement of data.

In various examples, the controller can be directly coupled to the storage device and the memory device. The controller can be indirectly coupled to the host via the storage device. The controller can monitor a plurality of regions of the memory device to determine whether the plurality of regions meet a criterion of fullness. The controller can, responsive to determining that the plurality of regions meet the criterion of fullness, read data from the plurality of regions. Responsive to reading the data from the plurality of regions, the controller can store the data in the storage device and delete the data from the plurality of regions. Responsive to storing the data, the controller can report to a host that the data has been moved from the memory device to the storage device. Although the controller can be indirectly coupled to the host, the controller can be independent from the host because the controller is not directly coupled to the host.

The controller can read the data from the plurality of regions without routing data the through the host. The controller can provide access command to the memory device to read the data from the plurality of regions. The controller can store the data in the storage device without routing the data through the host. The controller can monitor data, read the data and store the data without routing the data through the host.

The controller can monitor the plurality of regions of the memory device utilizing an interconnect that couples the controller to the memory device and the storage device. The interface between the controller, the memory device, and the storage device can be an interconnect. The interconnect can directly couple the memory device to the controller and the controller to the storage device without coupling the memory device to the storage device. In various examples, a first interconnect can couple the memory device to the controller while a second interconnect can couple the controller to the storage device. The controller can read the data from the plurality of regions of the memory device by routing the data through an interconnect that couples the controller to the memory device. The controller can store the data in the storage device utilizing an interconnect that couples the controller to the storage device.

The controller can be implemented in a MCP that also comprises the storage device and the memory device. Traditionally the storage device and the memory device that are implemented in separate chips may not be referred to as a memory sub-system because data can only be transferred between the two via a host. The memory device can be referred to as a memory sub-system and the storage device can be referred to as a memory sub-system. In various examples described herein, the memory device and the storage device collectively can be referred to as a memory sub-system because the memory device and the storage device are implemented in a MCP and because the memory device and the storage device can communicate through the controller that is not part of the host and is not directly coupled to the host.

The controller can report to the host that the data has been moved from the memory device to the storage device utilizing an interconnect coupling the controller to the storage device. The controller can report to the host that the data has been moved from the memory device to the storage device utilizing a bus coupling the host to the storage device.

In various instances, a controller can monitor a plurality of regions of the memory device to determine whether data is needed by an application executed on a host. Responsive to determining that the data is needed by the application, the controller can read the data from the storage device. Responsive to reading the data from the storage device, the controller can store the data in the plurality of regions of the memory device. Responsive to storing the data in the plurality of regions, the controller can report to the host that the data is stored in the plurality of regions, where the controller is implemented independent from the host.

The controller can determine whether data is needed by the application executed on the host by monitoring a plurality of access commands provided from the host to the memory device. For example, if multiple access commands are provided from the host to the memory device, then the controller can move data to the memory device expecting that the host will request the data.

The controller can, responsive to determining that the data is needed by the application, read different data from the plurality of regions. Responsive to reading the different data from the plurality of regions the controller can store the different data in the storage device prior to storing the data in the plurality of regions of the memory device.

The controller can receive a command from the host to manage the plurality of regions of the memory device. In various instances, if the controller manages the plurality of regions of the memory device and/or the storage device, then the host may refrain from managing the plurality of regions.

The controller can report to the host utilizing a different controller of the storage device. The controller can provide signals to the different controller of the storage device such that the different controller provides the signals to the host via a bus coupling the host to the storage device.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the actions and processes of a computer system, or similar electronic computing device, that manipulate and transform data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus configured to:
a controller directly coupled to a storage device via a first interface and directly coupled to a memory device via a second interface,
wherein the storage device is coupled to a host via a third interface,
wherein the first interface is configured to indirectly couple the controller to a host via the third interface and through the storage device, and
wherein the controller is configured to:
monitor a plurality of regions of the memory device to determine whether the plurality of regions meet a criterion of fullness;
responsive to determining that the plurality of regions meet the criterion, read data from the plurality of regions;
responsive to reading the data from the plurality of regions:
store the data in the storage device; and
delete the data from the plurality of regions; and
responsive to storing the data, report to the host via the first interface that the data has been moved from the memory device to the storage device, wherein the controller is implemented independent from the host.

2. The apparatus of claim 1, wherein the controller is configured to read the data from the plurality of regions without routing the data the through the host.

3. The apparatus of claim 1, wherein the controller is configured to store the data in the storage device without routing the data through the host.

4. The apparatus of claim 1, wherein the controller is configured to monitor the plurality of regions of the memory device utilizing an interconnect that couples the controller to the memory device and the storage device.

5. The apparatus of claim 1, wherein the controller is configured to read the data from the plurality of regions of the memory device by routing the data through an interconnect that couples the controller to the memory device.

6. The apparatus of claim 1, wherein the controller is configured to store the data in the storage device utilizing an interconnect that couples the controller to the storage device.

7. The apparatus of claim 1, wherein the controller configured to monitor the plurality of regions and store the data in the storage device that is implemented in a same multichip package (MCP) as the memory device and the storage device.

8. The apparatus of claim 1, wherein the controller is further configured to report to the host that the data has been moved from the memory device to the storage device utilizing an interconnect coupling the controller to the storage device.

9. The apparatus of claim 8, wherein the controller is further configured to report to the host that the data has been moved from the memory device to the storage device utilizing a bus coupling the host to the storage device.

10. A method comprising:
receiving, from a host and at a controller coupled to a storage device and to a memory device and implemented independent from the host, a first address range of a storage device and a second address range of the memory device;
wherein the controller is directly coupled to the storage device via a first interface, is directly coupled to the memory device via a second interface,
wherein the storage device is coupled to the host via a third interface, and
wherein the controller is indirectly coupled to the host via the first interface, the third interface, and through the storage device;
monitoring, at the controller, the second address range of the memory device to determine whether memory cells corresponding to the second address range meet a criterion for fullness;
responsive to determining that the memory cells corresponding to the second address range meet the criterion, providing a first access command to the memory device to read data from the second address range;
responsive to reading the data from the second address range:
providing a second access command to the first address range of the storage device to store the data in the storage device;
providing a third access command to the memory device to delete the data from the second address range of the memory device; and
responsive to storing the data in the storage device, providing signals to the host, via the first interface, to report that the data is stored to the first address range and that the memory cells corresponding to the second address range are available to store additional data.

11. The method of claim 10, wherein monitoring the second address range further comprises determining that a quantity of data stored at the second address range is greater than a threshold.

12. The method of claim 11, further comprising, responsive to determining that the quantity of data is greater than the threshold, determining that the memory cells corresponding to the second address range are full.

13. The method of claim 11, further comprising receiving the threshold from the host.

14. The method of claim 10, wherein monitoring the second address range of the memory device further comprises monitoring a logical address range of the memory device.

15. The method of claim 10, wherein providing the signals to the host further comprises providing the signals to modify a table to reflect that the data is stored to the first address range and that the memory cells corresponding to the second address range are available to store additional data.

16. An apparatus, comprising:
a storage device;
a memory device; and
a controller directly coupled to the storage device via a first interface, directly coupled to the memory device via a second interface,
wherein the storage device is coupled to a host via a third interface and
wherein the controller is indirectly coupled to a host via the first interface, the third interface, and through the storage device, the controller configured to:
monitor a plurality of regions of the memory device to determine whether data is needed by an application executed on host;
responsive to determining that the data is needed by the application, read the data from the storage device;
responsive to reading the data from the storage device, store the data in the plurality of regions of the memory device; and
responsive to storing the data in the plurality of regions, report to the host, via the first interface, that the data is stored in the plurality of regions, wherein the controller is implemented independent from the host.

17. The apparatus of claim 16, wherein controller is further configured to determine whether the data is needed by the application executed on the host by monitoring a plurality of access commands provided from the host to the memory device.

18. The apparatus of claim 17, wherein the controller is further configured to:
responsive to determining that the data is needed by the application, read different data from the plurality of regions; and
responsive to reading the different data from the plurality of regions store the different data in the storage device prior to storing the data in the plurality of regions of the memory device.

19. The apparatus of claim 17, wherein the controller is further configured to receive a command from the host to manage the plurality of regions of the memory device.

20. The apparatus of claim 17, wherein the controller configured to report to the host is further configured to report to the host utilizing a different controller of the storage device.

\* \* \* \* \*